US011425045B1

United States Patent
Marupaduga

(10) Patent No.: US 11,425,045 B1
(45) Date of Patent: Aug. 23, 2022

(54) PORT ASSIGNMENT BASED ON CONGESTION AND WIRELESS DEVICE CHARACTERISTICS

(71) Applicant: Sprint Spectrum LP, Overland Park, KS (US)

(72) Inventor: Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 5 days.

(21) Appl. No.: 16/997,207

(22) Filed: Aug. 19, 2020

(51) Int. Cl.
*H04W 28/02* (2009.01)
*H04L 47/11* (2022.01)
*H04L 47/12* (2022.01)

(52) U.S. Cl.
CPC .............. *H04L 47/14* (2013.01); *H04L 47/11* (2013.01); *H04L 47/12* (2013.01)

(58) Field of Classification Search
CPC ......... H04L 47/22; H04L 45/02; H04L 47/12; H04W 74/08
See application file for complete search history.

(56) References Cited

U.S. PATENT DOCUMENTS

| 8,184,528 | B2 | 5/2012 | Parker | |
| 10,368,321 | B1* | 7/2019 | Sitaram | H04W 24/02 |
| 10,595,286 | B2* | 3/2020 | Ryu | H04J 11/003 |
| 2015/0124616 | A1* | 5/2015 | Lohman | H04L 43/0894 |
| | | | | 370/235 |
| 2017/0118672 | A1* | 4/2017 | Zhang | H04W 28/0289 |
| 2021/0092690 | A1* | 3/2021 | Bergstrom | H04W 52/367 |

* cited by examiner

*Primary Examiner* — Donald L Mills

(57) ABSTRACT

A method and system identify a congestion parameter for multiple ports of a cell site router (CSR) and determine a characteristic of a wireless device communicating using the CSR. The method and system further assign the wireless device to a port of the CSR based on the characteristic of the wireless device and the congestion parameter. The method and system have the effect of assigning wireless devices having more capabilities to ports having the most congestion as the more capable devices are more likely to have sufficient retransmission power in the event of congestion.

16 Claims, 7 Drawing Sheets

PORT ASSIGNMENT BASED ON CONGESTION AND WIRELESS DEVICE CHARACTERISTICS

TECHNICAL BACKGROUND

A wireless network, such as a cellular network, can include an access node (e.g., base station) serving multiple wireless devices or user equipment (UE) in a geographical area covered by a radio frequency transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)). Deployment of the evolving RATs in a network provides numerous benefits. For example, newer RATs may provide additional resources to subscribers, faster communications speeds, and other advantages. However, newer technologies may also have limited range in comparison to existing technologies. To ensure consistent coverage through a wide geographic range, existing technologies such as 4G are often used in combination with newer technologies such as 5GNR.

When multiple RATs are used in combination, access nodes may utilize different frequency bands for deploying the different RATs over a wireless air interface. For example, when a 5G RAT is used in combination with a 4G RAT, a first frequency band may be utilized for the 4G RAT and second frequency band may be utilized for the 5G RAT. Alternatively or additionally, the access node may provide an inter-band coverage combination that utilizes the first frequency band for both the 4G RAT and the 5G RAT. Other inter-band combinations are possible. The different RATS and different frequency bands may experience different volumes of loading and congestion. A CSR (cell site router) may include ports for each RAT and/or frequency band and the ports may thus have different congestion parameters.

Further, as UEs have evolved, in an effort to boost coverage and enhance throughput in wireless networks, higher power class User Equipment(s) (UEs) and/or wireless devices (HPUEs) have been proposed. HPUEs are capable of transmitting at a maximum allowable transmit power that is higher than lower power class UEs (LPUEs). As shown in Table 1 below, the maximum allowable transmit power for wireless devices can be defined by the power class of the wireless device.

TABLE 1

| Operating Band | Power Class 1 Wireless Device | | Power Class 2 Wireless Device | | Power Class 3 Wireless Device | | Power Class 4 Wireless Device | |
|---|---|---|---|---|---|---|---|---|
| | Power (dBm) | Tol. (dB) | Power (dBm) | Tol. (dB) | Power (dBm) | Tol. (dB) | Power (dBm) | Tol. (dB) |
| Band I | 31 | ±2 | 26 | ±2 | 23 | ±2 | 21 | ±2 |
| Band II | — | — | 26 | ±2 | 23 | ±2 | 21 | ±2 |
| Band III | — | — | — | — | 23 | ±2 | 21 | ±2 |

HPUEs generally fall into power classes 1 or 2, whereas LPUEs fall into power class 3 or 4. While a LPUE may not successfully transmit to an access node in a heavily loaded network, an HPUE in the same location may have sufficient transmit power to continue to transmit to the access node. Further, it should be noted that both HPUEs and LPUEs may have specific hardware capabilities such that their transmit power may be greater than or less than the transmit power specified above with respect to each of the power classes.

While HPUEs and LPUEs have different characteristics and capabilities, existing band assignment methods fail to consider the transmission characteristics of the wireless device in conjunction with congestion at the different ports of the CSR. Accordingly, a solution is needed that utilizes wireless device characteristics to more proactively assist in making band assignment determinations to transition wireless devices to a different RAT or CSR port as appropriate to the particular characteristics of the wireless device.

Overview

Exemplary embodiments described herein include systems, methods, and nodes for CSR port assignment based on wireless device characteristics. An exemplary method includes identifying a congestion parameter for multiple ports of a cell site router (CSR) and determining a characteristic of a wireless device communicating using the CSR. The method additionally includes assigning the wireless device to a port of the CSR based on the characteristic of the wireless device and the congestion parameter.

An exemplary system described herein includes at least one access node configured to facilitate communication in a wireless network and at least one processor coupled to the access node and configured to perform multiple operations. The operations include identifying a congestion parameter for multiple ports of a cell site router (CSR) and determining a characteristic of a wireless device communicating using the CSR. The operations additionally include assigning the wireless device to a port of the CSR based on the characteristic of the wireless device and the congestion parameter.

An exemplary processing node is described herein to perform multiple operations. The operations include identifying a packet drop rate for multiple ports of a cell site router (CSR) and determining a characteristic of a wireless device communicating using the CSR. The operations further include assigning the wireless device to a port of the CSR based on the characteristic of the wireless device and the packet drop rate.

DETAILED DESCRIPTION

Figure 1:
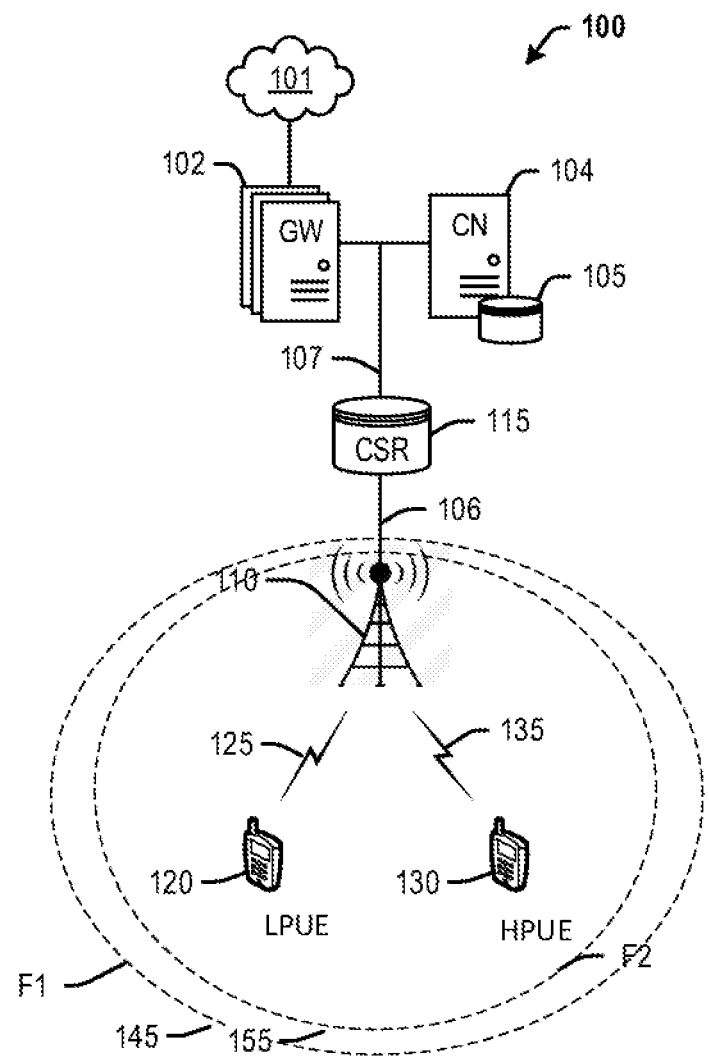
FIG. 1 depicts an exemplary communication system in accordance with embodiments described herein.

Exemplary embodiments described herein include systems, methods, and processing nodes for assigning wireless device to port of a cell site router (CSR) and therefore also to an inter-band combination in an EN-DC network based on characteristics of the wireless device. Thus, embodiments disclosed herein operate in networks utilizing an EN-DC architecture, which allows devices to access both LTE and 5G simultaneously on the same spectrum or different spectrum bands. For example, when a 5G RAT is used in combination with a 4G RAT, a first frequency band may be utilized for the 4G RAT and second frequency band may be utilized for the 5G RAT. Alternatively or additionally, the access node may provide an inter-band coverage combination that utilizes the first frequency band for both the 4G RAT and the 5G RAT. Other inter-band combinations are possible. As will be further described below, the ports of the CSR correspond to a RAT and a frequency band.

In embodiments disclosed herein, a cell or wireless network may be provided by an access node. The access node may utilize one or more antennas to communicate with wireless devices or UEs. Because certain network conditions are likely to result in poor performance of wireless devices in the network, embodiments provided herein assign wireless devices to a CSR port and thus an inter-band combination based on wireless device characteristics and congestion parameters at each port of the CSR. The assignment may be dynamically performed based on reported wireless device characteristics and congestion experienced at the CSR. The congestion at the CSR ports may be measured for example, by a packet drop rate at each CSR port.

In exemplary embodiments, a processor or processing node associated with an access node may determine whether a wireless device is a high power class wireless device or a low power class wireless device. In order to make this determination, access nodes may receive communications from wireless device such as HPUEs and LPUEs. For example, the HPUEs and LPUES can use a UE CAPABILITY message to indicate (or report) at to the access node that an HPUE is a power class 2 UE and/or wireless device that corresponds to a Power of +26 dBm (illustrated in Table 1) with a nominal power tolerance (i.e., power error limit) of ±2 dB (e.g., for E-UTRA bands). In addition, HPUEs or LPUEs can use power headroom report (PHR) and/or enhanced PHR (ePHR) message(s) to report a current transmit power state (e.g., how much power the HPUEs or LPUEs required in a previous subframe structure) to the AN. Alternatively, in another exemplary embodiment, HPUEs and LPUEs can be configured with a chipset type or version, which may be provided to the access node by the HPUEs or LPUEs during an ATTACH PROCEDURE. Other methods of communicating whether the UE is a HPUE or LPUE may be used in conjunction with the disclosed embodiments. Accordingly, a processor or processing node may determine if a wireless device interacting with the access node is an HPUE or an LPUE.

The processor or processing node is also programmed to identify congestion parameters for the ports of a CSR. The congestion parameters may include, for example, a packet drop rate for the CSR port, or a resource availability parameter related to the port. For example, a measurement of buffer space available for the port could be utilized.

When the access node, processor, or processing node identifies an HPUE, it may be programmed to assign the HPUE to a first CSR port having more congestion than a second CSR port. The assignment may be accomplished dynamically. Because HPUEs have a higher transmit power than LPUEs, they will transmit even when RF conditions are poor because of their higher power. Furthermore, in the instance of a high packet drop rate, HPUEs have the capability to re-transmit the dropped packets. LPUEs have a lower transmit power and therefore have difficult transmitting in poor RF conditions. It is less likely that LPUEs will have the capability to re-transmit dropped packets. Accordingly, the assignment of the HPUEs to the first CSR port having a higher incidence of congestion than a second CSR port improves overall network performance. In further exemplary embodiments, LPUEs may be identified and assigned to the second CSR port having less congestion than the first CSR port to ensure that the LPUEs are less likely to encounter poor RF conditions. When multiple CSR ports are available, the HPUEs may be assigned to the CSR port having the highest incidence of congestion.

Therefore, in accordance with embodiments disclosed herein, methods and systems identify wireless device characteristics and determine a level of congestion at multiple CSR ports. These steps may be performed in any order. Based on the wireless device characteristics and the congestion at the CSR ports, the methods and system assign the wireless devices to an appropriate CSR port.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

The terms "transmit" and "transmission" in data communication may also encompass receive and receiving data. For example, "data transmission rate" may refer to a rate at which the data is transmitted by a wireless device and/or a rate at which the data is received by the wireless device.

An exemplary system described herein includes at least an access node (or base station), such as an eNodeB, a next generation NodeB (gNodeB), and a plurality of end-user wireless devices. For illustrative purposes and simplicity, the disclosed technology will be illustrated and discussed as being implemented in the communications between an access node (e.g., a base station) and a wireless device (e.g., an end-user wireless device). It is understood that the disclosed technology may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB. One node, such as, for example, the LTE eNodeB, may serve as a master node and may make a CSR port assignment decision for the wireless device using the methods set forth herein.

In addition to the systems and methods described herein, the operations of assigning wireless devices to a CSR port based on wireless device characteristics and congestion at the CSR ports may be implemented as computer-readable instructions or methods, and processing nodes on the network for executing the instructions or methods. The processing node may include a processor included in the access node or a processor included in any controller node in the wireless network that is coupled to the access node.

Embodiments disclosed herein operate in a heterogeneous 5G NR EN-DC network with HPUEs and LPUEs, where there are multiple EN-DC bands. Embodiments disclosed herein assign HPUEs to CSR ports and thus, frequency bands based on a high level of congestion at the CSR port relative to other CSR ports and assign LPUEs to CSR ports and associated frequency bands with less congestion than other CSR ports. All wireless device may be in the same sector that radiates multiple frequencies, each associated with different bands.

FIG. 1 depicts an exemplary system communication system 100 in which wireless devices are assigned to a CSR port based on wireless device characteristics and a congestion level at the CSR port. System 100 comprises a communication network 101, gateway node(s) 102, controller node 104, access node 110, cell site router 115, and wireless devices 120 and 130. In other embodiments, any other combination of cell site routers, access nodes, and wireless devices may be evident to those having ordinary skill in the art in light of this disclosure. In this exemplary embodiment, access node 110 may be a macrocell access node configured to deploy wireless air-interfaces 125, 135 to which wireless devices 120, 130 can respectively attach. For example, access node 110 can include a combination of a 4G eNodeB and a 5G gNodeB. In other words, the access node 110 can comprise antennae that are configured to communicate using 4G LTE (i.e. a first RAT) as well as antennae that are configured to communicate using 5G NR (a second RAT). Further, the access node 110 can include a plurality of antennae (or antenna elements), a portion of which is configured to deploy a first bandwidth or RAT (e.g. 4G LTE), and a portion of which is configured to deploy a second bandwidth or RAT (e.g. 5G NR). Consequently, wireless devices 120, 130 are respectively capable of attaching to 4G and 5G RATs. Further, cell site router 115 includes any node that is configured to route incoming data packets from network 101 and/or gateway node(s) 102 to access node 110 (and wireless devices 120, 130), and to route outgoing data packets received from the access node 110 (and originating at wireless devices 120, 130) to the gateway node(s) 102 and/or network 101.

Access node 110 is illustrated as having a coverage area 145 associated with a first frequency band F1 and a coverage area 155 associated with a second frequency band F2. Thus, access node 110 is configured to deploy radio air interfaces utilizing a first frequency F1 and a second frequency F2. In this exemplary embodiment, access node 110 deploys a radio air interface utilizing frequency F1 over a coverage area 145 and a radio air interface utilizing frequency F2 over a coverage area 155. F1 and F2 may represent an inter-band combination wherein F1 is used for transmission over one RAT and F2 is used for transmission over another RAT. As will be described further below, the frequency bands F1 and F2 may be the same or different. Further, additional inter-band combinations may exist in the coverage areas of access nodes 110. In either case, access node 110 can deploy one or more radio air interfaces that utilize one or more frequencies, enabling wireless communication with wireless devices 120 and 130. As shown herein, wireless devices 120, 130 attach to access node 110 via frequency bands F1 or F2. Although access nodes 110 and wireless devices 120 and 130 are illustrated in FIG. 1, any number of access nodes and wireless devices can be implemented within system 100.

Access node 110 can be any network node configured to provide communication between wireless devices 120, 130 and communication network 101, including standard access nodes such as a macro-cell access node, base transceiver station, a radio base station, an eNodeB device, an enhanced eNodeB device, or the like. In an exemplary embodiment, a macro-cell access node 110 can have a coverage area in the range of approximately five kilometers to thirty-five kilometers and an output power in the tens of watts. Further, access node 110 may comprise any short range, low power, small-cell access nodes such as a microcell access node, a picocell access node, a femtocell access node, or a home eNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107.

Wireless devices 120 and 130 may be any device, system, combination of devices, or other such communication platform capable of communicating wirelessly with access node 110 using one or more frequency bands deployed therefrom. Wireless devices 120 and 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible. As set forth above, wireless devices may be or include HPUEs or LPUEs.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120, 130. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include S1, S4, S5, S11, S1-MME, or S1-U communication links. Other wired or wireless protocols can also be used. Communication links 106, 107 can be a direct link or might include various equipment, intermediate components, systems, and networks. Communication links 106, 107 may comprise many different signals sharing the same link.

Gateway node(s) 102 can be any network node configured to interface with other network nodes using various protocols. Gateway node(s) 102 can communicate user data over system 100. Gateway node(s) 102 can be standalone computing devices, computing systems, or network components, and can be accessible, for example, by a wired or wireless connection, or through an indirect connection such as through a computer network or communication network. For example, gateway node(s) 102 can include a serving gateway (S-GW) and/or a public data network gateway (P-GW), etc. One of ordinary skill in the art would recognize that gateway node(s) 102 are not limited to any specific technology architecture, such as Long Term Evolution (LTE) and can be used with any network architecture and/or protocol.

Each of gateway node(s) 102 can comprise a processor and associated circuitry to execute or direct the execution of computer-readable instructions to obtain information. Gateway node(s) 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node(s) 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100. This information may be requested by or shared with cell site router 115, gateway node(s) 102 and/or access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
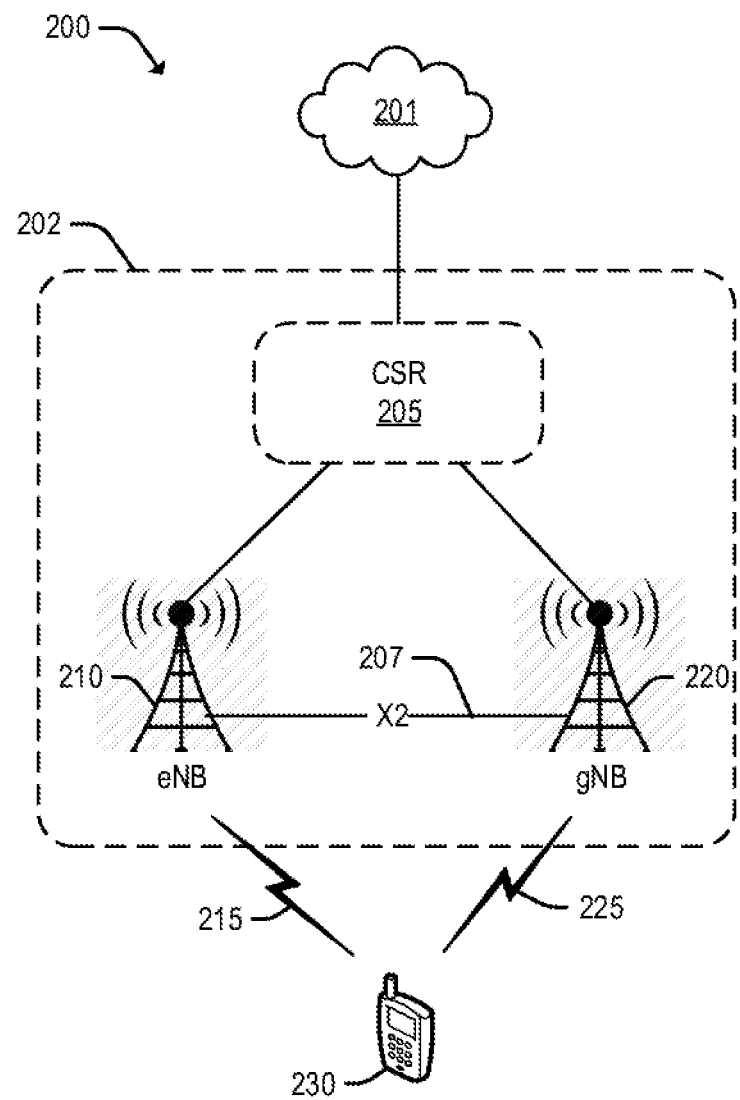
FIG. 2 depicts further details of the exemplary system.

FIG. 2 depicts an exemplary system 200 for E-UTRAN-NR Dual Connectivity (EN-DC) using 4G LTE and 5G NR. The access node 110 shown in FIG. 1 may utilize EN-DC using 4G LTE and 5G NR as shown. As shown in FIG. 1, the 4G LTE and 5G NR in a single node may be combined to form an inter-band combination. System 200 includes a communication network 201, a radio access network 202, and a wireless device 230. Radio access network further includes at least a cell site router 205, and access nodes or antennas 210, 220. In embodiments as set forth herein, access node 110 shown in FIG. 1, may include antennas 210 and 220, functioning as shown in FIG. 2. Cell site router 205 can include any network node that is configured to route incoming data packets from network 201 to wireless device 230 via access node(s) 210, 220, and to route outgoing data packets received from the wireless device 230 via access node(s) 210, 220 to the network 201. Therefore, network 201 can include any combination of networks, including a core network, intermediate/backhaul network, or packet data network (PDN). Persons having ordinary skill in the art may note that although only access nodes 210, 220, cell site router 205, and network 201 are illustrated in FIG. 2, other components such as gateways, controller nodes, user plane functions, etc. may be included as well.

In this exemplary embodiment, access node 210 can include an eNodeB, and access node 220 can include a gNodeB. For example, access node 210 can be configured to deploy a wireless interface 215 using a first radio access technology (RAT), e.g. 4G LTE, and access node 220 can be configured to deploy a second wireless interface 225 using a second RAT, e.g. 5G NR. Each RAT can be configured to utilize a different frequency band or sub-band, a different channel size or bandwidth, and so on. For example, the 5G NR wireless interface 225 can be configured to utilize higher frequencies and larger channel bandwidths than the 4G LTE wireless interface 215. Thus, for example, the access node 210 may be an anchor LTE node in band 25 and the access node 220 may utilize band 41. The nodes can alternatively both be in band 41. Further, different ports of the CSR 205 are configured for transmission over different RATs and different bands.

Further, access nodes 210, 220 can be configured to communicate using both RATs at the same time. For example, dual connections can be set up with wireless device 230 using both 4G and 5G air interfaces 215, 225 respectively, the 4G wireless interface 215 being used to transmit control information, and the 5G wireless interface 225 being used to transmit data information. For example, a processing node within system 200 (for example, communicatively coupled to access nodes 210, 220, or any other network node) can be configured to determine whether or not wireless device 230 is capable of communicating using both RATs and instruct the access node 210 to broadcast an indicator in, for example, a system information message. Responsive to the indicator, wireless device 230 can attach to access node 210 which can use the 4G carrier to control and set up a dual connectivity session with wireless device 230. While different carriers offer different channel bandwidths, certain combinations of carriers may provide a greater aggregate channel bandwidth. In an exemplary embodiment utilizing multiple input multiple output (MIMO), wireless device 230 can receive a MIMO data stream using the 5G NR wireless interface, with control signaling that enables the MIMO data stream using the 4G wireless interface.

Further, within radio access network 202, access nodes 210 and 220 can be coupled via a direct communication link 207, which can include an X2 communication link. Access nodes 210 and 220 can communicate control and data information across X2 communication link 207. In an exemplary embodiment, access node 220 includes logic to determine how to allocate data packets between access node 210 and access node 220, wherein the data packets flow between wireless device 230 and a network node on network 201 via CSR 205. Such logic may include a packet data convergence protocol (PDCP) function. Thus, RAN 202 can include a plurality of antenna elements (not shown herein) coupled to access nodes 210 and 220, with different antenna elements configured to deploy a different radio air interface using a different frequency. For example, each antenna element can be configured to deploy a 4G LTE air interface 215 or a 5G NR air interface 225. Different quantities of antenna elements can be configured to deploy (or "assigned" to) a different type of air interface 215, 225, depending on the needs of a network operator or users. Further, in split mode or "concurrent mode", individual antenna elements can be configured to simultaneously deploy at least two different air interfaces 215, 225, which enables wireless device 230 to transmit uplink data via each of the at least two air interfaces 215, 225 simultaneously. Thus, while access nodes that are not capable of utilizing uplink split mode may use the 4G LTE RAT for control transmissions and the 5G NR RAT for data transmissions, access nodes 210 and 220 capable of uplink split mode can receive uplink data via both 4G LTE and 5G NR RAT air interfaces 215, 225. In an exemplary embodiment, the gNodeB portion 220 of RAN 202 is configured with logic to determine a transmission path for data packets traversing RAN 202. The transmission paths can traverse different RAT air interfaces 215, 225, as well as different ports of CSR 205.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 and/or RAN 202 may be, comprise, or include computers systems and/or processing nodes. This includes, but is not limited to: access nodes 110, 210, 220, controller node 104, and/or network 101.

Figure 3:
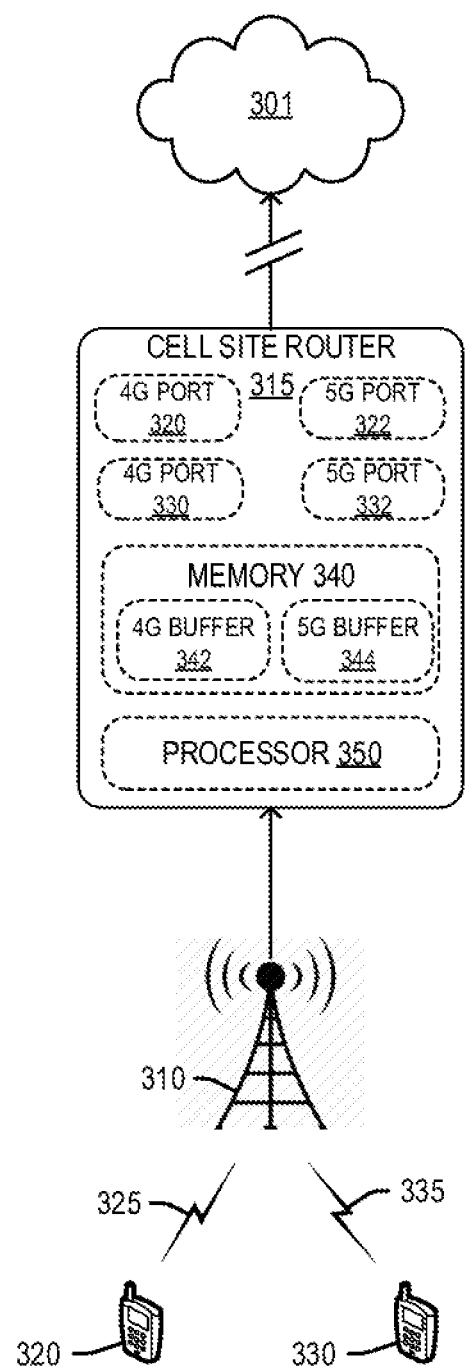
FIG. 3 depicts a schematic of an exemplary cell site router.

FIG. 3 depicts a schematic of an exemplary cell site router. Similar to system 100, cell site router 315 is illustrated as being coupled to an access node 310, and capable of communicating with core network 301 (which can include gateway nodes, controller nodes, and other interfaces to an external network). Cell site router 315 can include any node that is configured to route data packets between core network 302 and access node 310 via one or more ports. In addition to a processor 350 and a memory 340, cell site router 315 is illustrated as having 4G ports 320 and 330 and 5G ports 322 and 332, which are used to transport data packets that are associated with 4G and/or 5G RATs. The number of ports illustrated is merely exemplary as a larger or smaller number of ports could be included. In addition, the memory 340 stores at least a 4G buffer 342 and a 5G buffer 344, respectively associated with the 4G ports and the 5G ports. In embodiments as set forth herein, separate buffers may be included for each port. The cell site router 315 can be configured to receive a data transmission from the access node 310 and forward the data transmission to the destination node (via the network 301 and/or any intervening gateway nodes). In other words, the data transmission may be an uplink data transmission.

The uplink data transmission traverses a buffer of the cell site router 315 that is associated with a RAT that the data transmission utilizes, such as 3G, 4G, 5G, TDD, FDD, etc. Thus, the cell site router 315 may include a plurality of ports as shown herein, each associated with a different radio access technology. For example, data transmissions using 4G are transmitted via a 4G port of the cell site router 315, data transmissions using 5G are transmitted via a 5G port of the cell site router 315, and so on.

Figure 4:
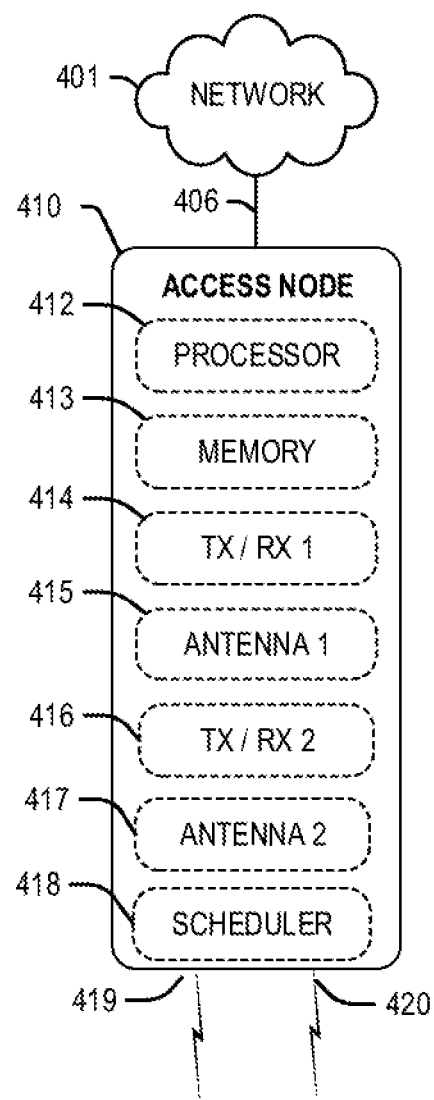
FIG. 4 depicts an exemplary access node in accordance with embodiments described herein.

FIG. 4 depicts an exemplary access node 410. Access node 410 may comprise, for example, a macro-cell access node, such as access node 110 described with reference to FIG. 1. Access node 410 is illustrated as comprising a processor 412, memory 413, transceiver TX/RX 1 414, and antenna 1 415, transceiver TX/RX 2 416, antenna 2, 417, and scheduler 418. The first transceiver 414 and antenna 415 may be provided for deploying a radio air interface utilizing a first frequency band, and the second transceiver 416 and antenna 417 may deploy a radio air interface utilizing a second frequency band. Two pairs of transceivers and antennae are illustrated herein solely to simplify the written description, and it may be evident to those having ordinary skill in the art, that any combination of transceivers and antennae may be incorporated in order to deploy carriers of multiple frequencies, formed beams, MU-MIMO data streams, and/or to facilitate communication with other network nodes on network 401. Processor 412 executes instructions stored on memory 413, while transceivers 414 and 416 and antennas 415 and 417 enable wireless communication with other network nodes, such as wireless devices and other nodes. For example, access node 410 may be configured to identify wireless device characteristics, identify congestion levels at CSR ports, and assign the wireless devices to a port or inter-band combination based on the congestion and wireless device characteristics. Scheduler 418 may be provided for scheduling resources based on the presence of the wireless devices. These features may be enabled by access node 410 comprising two co-located cells, or antenna/transceiver combinations that are mounted on the same structure. Network 401 may be similar to network 401 discussed above. The wireless devices may operate in carrier aggregation mode, during which a wireless device utilizes more than one carrier, enabling the wireless devices to communicate with access node 410 using a combination of resources from multiple carriers.

Further, instructions stored on memory 413 can include instructions for dynamically assigning a wireless device to an inter-band combination or CSR port, which will be further explained below with reference to FIGS. 5-7. The instructions may facilitate identifying characteristics of UEs, such as transmit power, identifying congestion levels at the CSR ports, and dynamically assigning the UEs based on their characteristics and network congestion to a CSR port and inter-band combination.

Figure 5:
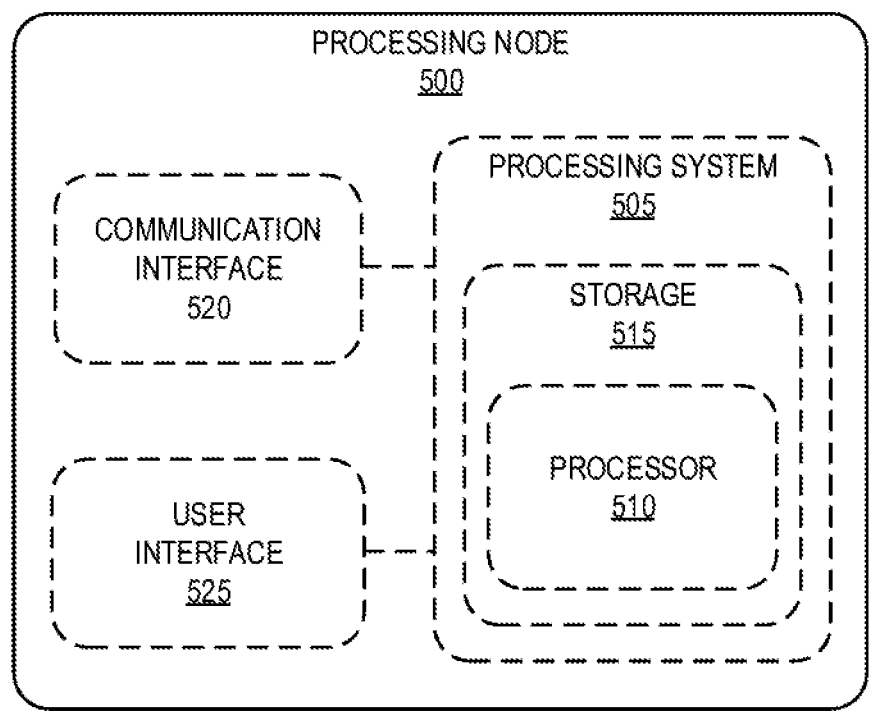
FIG. 5 depicts an exemplary processing node for port assignment in accordance with embodiments set forth herein.
Figure 6:
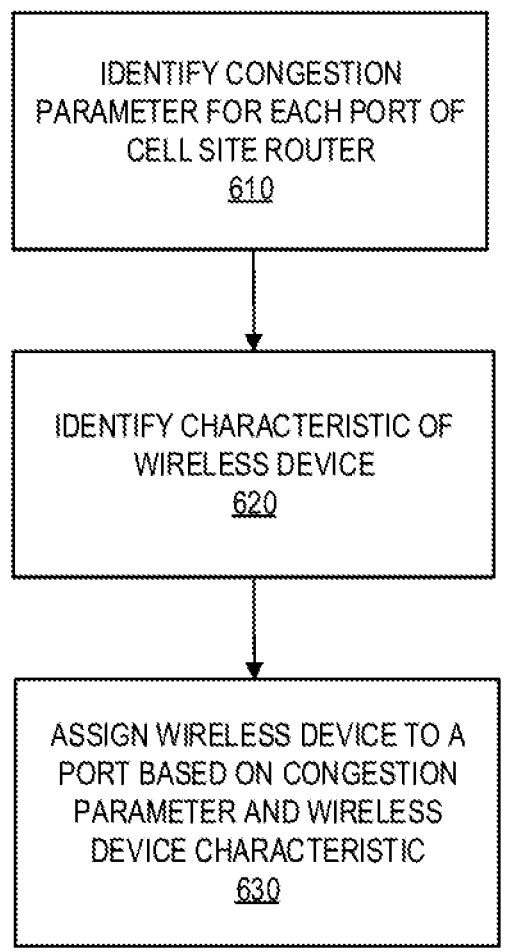
FIG. 6 depicts an exemplary method for port assignment in accordance with embodiments set forth herein.

FIG. 5 depicts an exemplary processing node 500, which may be configured to perform the methods and operations disclosed herein for dynamically assigning wireless devices to a CSR port and an inter-band combination based on the congestion parameters at the CSR port and characteristics of the wireless device. In some embodiments, processing node 500 may be included in an access node, such as access node 110, 210, 220, or 310. In further embodiments, processing node 500 may be included in controller node 104 and may be configured for controlling the access nodes.

Processing node 500 may be configured for performing wireless device assignment by assigning wireless devices to a CSR port and thus an inter-band combinations based on wireless device characteristics. The assignment may occur dynamically in real time based on an identification of a wireless device characteristic, such as whether the wireless device is an HPUE. The dynamic assignment may additionally be based on congestion levels at the CSR ports. Processing node 500 may include a processing system 505. Processing system 505 may include a processor 510 and a storage device 515. Storage device 515 may include a disk drive, a flash drive, a memory, or other storage device configured to store data and/or computer readable instructions or codes (e.g., software). The computer executable instructions or codes maybe accessed and executed by processor 510 to perform various methods disclosed herein. Software stored in storage device 515 may include computer programs, firmware, or other form of machine-readable instructions, including an operating system, utilities, drivers, network interfaces, applications, or other type of software. For example, software stored in storage device 515 may include a module for performing various operations described herein. Processor 510 may be a microprocessor and may include hardware circuitry and/or embedded codes configured to retrieve and execute software stored in storage device 515.

Processing node 500 may include a communication interface 520 and a user interface 525. Communication interface 520 may be configured to enable the processing system 505 to communicate with other components, nodes, or devices in the wireless network. Communication interface 520 may include hardware components, such as network communication ports, devices, routers, wires, antenna, transceivers, etc. User interface 525 may be configured to allow a user to provide input to processing node 500 and receive data or information from processing node 500. User interface 525 may include hardware components, such as touch screens, buttons, displays, speakers, etc. Processing node 500 may further include other components such as a power management unit, a control interface unit, etc.

The disclosed methods for assigning wireless devices to a CSR port based on port congestion and wireless device characteristics are further discussed with reference to FIGS. 6 and 7. FIG. 6 illustrates an exemplary method 600 for dynamic assignment of wireless devices to CSR ports. The method may occur in dynamically in real time or at predetermined intervals. Method 600 may be performed by any suitable processor discussed herein, for example, a processor included in access node 110, 210, 220, 310, o 410 or processor 510 included in processing node 500, or a processor included in controller node 104. For discussion purposes, as an example, method 600 is described as being performed by a processor included in access node 110.

Method 600 starts in step 610 when the access node identifies a congestion parameter at each port of a cell site router. The congestion parameters may be or include any parameter indicative of congestion at a particular port. For example, the congestion may be determined by measuring a packet drop rate. Packet loss occurs when one or more packets of data travelling across the network fail to reach their destination. Packet loss may occur as a result of network congestion and may be measured as a percentage of packets lost with respect to packets sent for a particular port. As an alternative, congestion may be measured by determining available buffer space in a buffer dedicated to each port. Ports with less available buffer space would be determined as having more congestion than ports with more available buffer space. Other congestion parameters may be utilized.

In step 620, the access node identifies a characteristic of the wireless device. For example, the access node determines whether the wireless device is an HPUE or an LPUE. As set forth above, the identification may be made based on numerous methods including communications received at the access node from the wireless device. For example, the HPUEs and LPUEs can use a UE CAPABILITY message to indicate (or report) at to the access node that an HPUE is a power class 2 UE and/or wireless device that corresponds to a Power of +26 dBm (illustrated in Table 1) with a nominal power tolerance (i.e., power error limit) of ±2 dB (e.g., for E-UTRA bands). In addition, HPUEs or LPUEs can use power headroom report (PHR) and/or enhanced PHR (ePHR) message(s) to report a current transmit power state (e.g., how much power the HPUEs or LPUEs required in a previous subframe structure) to the AN. Alternatively, in another exemplary embodiment, HPUEs and LPUEs can be configured with a chipset type or version, which may be provided to the access node by the HPUEs or LPUEs during an ATTACH PROCEDURE. Other methods of communicating whether the UE is a HPUE or LPUE may be used in conjunction with the disclosed embodiments. Accordingly, a processor or processing node may determine if a wireless device is interacting with the access node is an HPUE or an LPUE.

In step 630, the access node assigns the wireless device to a CSR port based on the congestion parameter and the wireless device characteristic. For example, the access node may compare the congestion parameters of the CSR ports and may sort the ports based on congestion level. For example, the access node may sort the ports in descending order placing the port with the highest packet drop rate or the most congestion at the top of the list and the port with the least congestion at the bottom of the list. Alternatively, the access node may set a threshold congestion level and identify the ports having congestion that satisfies the threshold level and ports with insufficient congestion to satisfy the threshold level. The access node dynamically assigns the HPUEs to the port having the highest congestion levels or highest packet drop rates and dynamically assigns the LPUEs to the ports having the lowest congestion levels or lowest packet drop rates. Alternatively the access node assigns the HPUEs to the ports having the least available buffer space and assigns the LPUEs to the ports having the most available buffer space. The access node may be a master node, which is, for example, and LTE eNodeB. The master node may, by assigning the wireless devices to particular ports, also assign the wireless devices to particular RATs and inter-band combinations. This process increases overall network efficiency, as HPUEs are assigned to more congested ports, but as a result of their increased transmit power, are able to re-transmit data that is dropped on initial transmission. Thus, as network conditions deteriorate, the UEs having the stronger signal transmission characteristics, i.e., HPUEs, are likely to be able to continue to transmit, thereby improving overall network performance.

Figure 7:
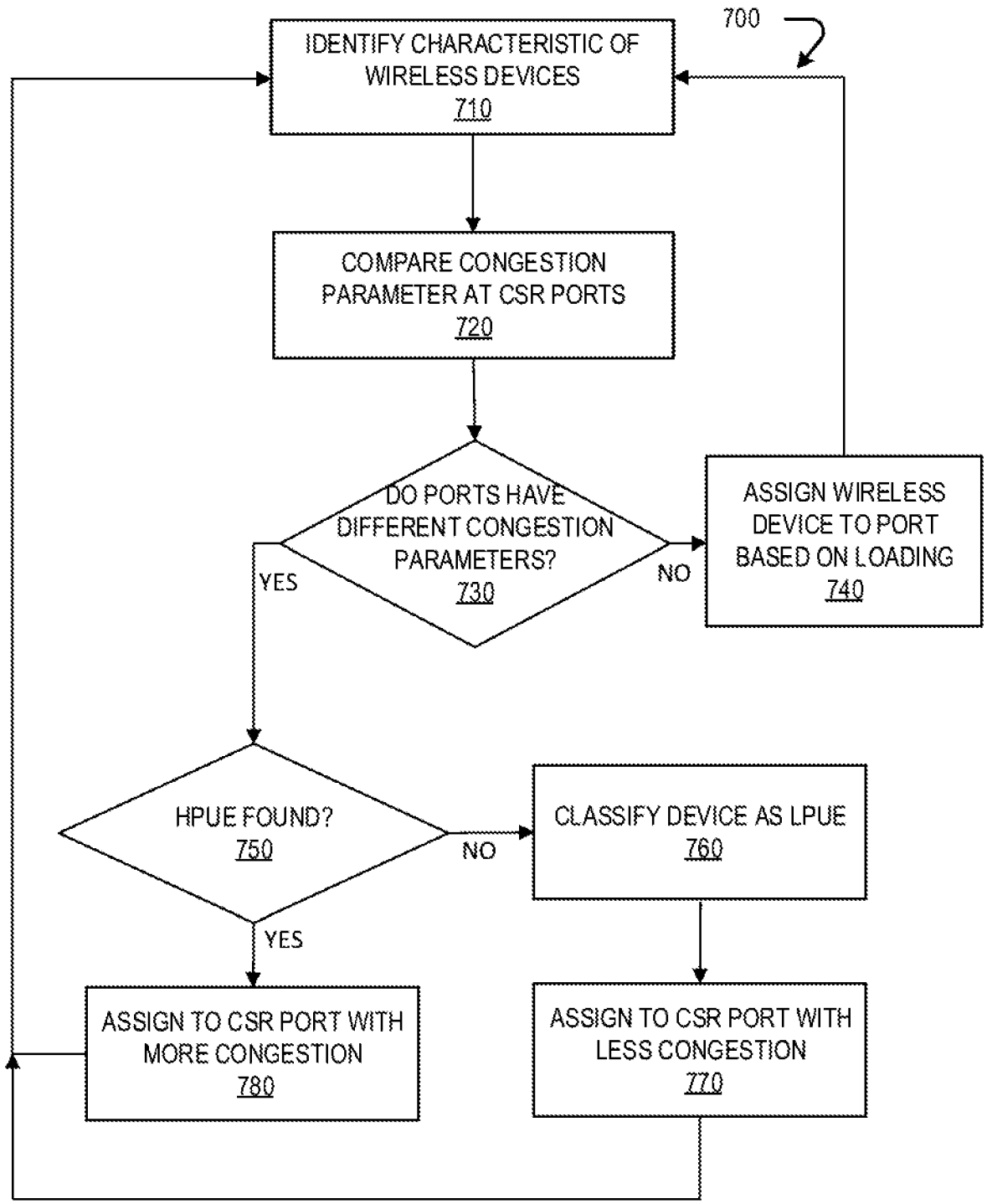
FIG. 7 illustrates another exemplary method for port assignment in accordance with embodiments set forth herein.

FIG. 7 illustrates a method 700 for dynamic assignment of UEs to CSR ports based on characteristics of the UE and congestion parameters at the CSR ports. Method 700 may be performed by any suitable processor discussed herein, for example, a processor included in access node 110, 210, 220, 310, or 410, or processor 510 included in processing node 500, or a processor included in controller node 104. For discussion purposes, as an example, method 700 is described as being performed by a processor included in access node 110.

In step 710, the access node determines a characteristic of the wireless device. In embodiments set forth herein, the access node may determine, for example, a transmit power of the wireless device, a chipset of the wireless device, or PHR of the wireless device. The determination may be made at the access node, for example, based on notifications sent by the wireless device to the access node using any of the methods set forth above with respect to step 610 in FIG. 6.

In step 720, the access node compares congestion parameters for at least two CSR ports. As set forth with respect to the method of FIG. 5, this comparison can be made, for example, by comparing packet drop rates at each port or by comparing buffer space available at each port. Other congestion parameters may also be utilized for comparison. Based on the comparison in step 720, the access node determines in step 730 if one of the CSR ports has more congestion or less congestion than other CSR ports. If in step 730, the access node determines that the congestion parameters are equivalent, then it may assign the wireless device randomly, not make an assignment, or assign the wireless device to a particular ports or inter-band combinations based on loading conditions. For example, if port has fewer wireless devices connecting, the access node may assign the wireless devices to that port in order to balance the network load in step 740. However, in step 730, if one CSR port is found to have a higher congestion level than other CSR ports, the access node determines if the wireless device is an HPUE in step 750. This determination may be based on the characteristics of the wireless device identified in step 710.

If the wireless device is determined to be an HPUE in step 750, the access node may assign the HPUE to the CSR port having more congestion in step 780. An assignment instruction may be sent by the access node to the wireless device for example by utilizing an RRC connection reconfiguration message or another message directed specifically to the wireless device. Thus, as network conditions deteriorate, the UEs having the stronger signal transmission characteristics, i.e., HPUEs are likely to be able to continue to transmit and re-transmit data during poor network, thereby improving overall network performance. However, if the device is not an HPUE, the access node may classify the wireless device as an LPUE in step 760. Once the wireless device is classified as an LPUE, the access node may assign the wireless device to a CSR port having less congestion in step 770. This assignment also increases overall network efficiency as LPUEs have less transmit power and are less capable of re-transmitting dropped packets than HPUEs.

In some embodiments, methods 600 and 700 may include additional steps or operations. Furthermore, the methods may include steps shown in each of the other methods. As one of ordinary skill in the art would understand, the methods 600 and 700 may be integrated in any useful manner. Additionally, in order to optimize a heterogeneous network, the methods disclosed may be performed for multiple devices in the network so that the wireless devices can be appropriately assigned.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising,
identifying a congestion parameter for a first port and a second port of a cell site router (CSR), wherein the first port utilizes a first radio access technology (RAT) and the second port utilizes a second RAT different from the first RAT;
determining a characteristic of a wireless device communicating using the CSR, wherein determining the characteristic of the wireless device comprises identifying the wireless device as one of a low power user equipment (LPUE) and a high power user equipment (HPUE);
comparing the identified congestion parameter for the first port and the second port;
identifying the first port as having higher congestion based on the congestion parameter comparison; and
assigning the wireless device to a port of the CSR based on the characteristic of the wireless device and the congestion parameter, wherein the HPUE is assigned to the first port having higher congestion.

2. The method of claim 1, further comprising identifying the wireless device as one of a LPUE and a HPUE based on a UE capability message sent from the wireless device.

3. The method of claim 1, further comprising identifying the wireless device as one of a LPUE and a HPUE based on a chipset type transmitted by the wireless device.

4. The method of claim 1, wherein the congestion parameter is a packet drop rate.

5. The method of claim 4, further comprising identifying the first port as having a higher packet drop than the second port.

6. The method of claim 5, further comprising assigning the HPUE to the first port having the higher packet drop rate than the second port.

7. The method of claim 5, further comprising assigning the LPUE to the second port having a lower packet drop rate than the first port.

8. The method of claim 1, further comprising performing the assignment using a master node.

9. A system comprising:
- at least one access node configured to facilitate communication in a wireless network;
- at least one processor coupled to the access node and configured to perform operations comprising,
- identifying a congestion parameter for a first port and a second port of a cell site router (CSR), wherein the first port utilizes a first radio access technology (RAT) and the second port utilizes a second RAT different from the first RAT;
- determining a characteristic of a wireless device communicating using the CSR, wherein determining the characteristic of the wireless device comprises identifying the wireless device as one of a low power user equipment (LPUE) and a high power user equipment (HPUE);
- comparing the identified congestion parameter for the first port and the second port;
- identifying the first port as having higher congestion based on the congestion parameter comparison; and
- assigning the wireless device to a port of the CSR based on the characteristic of the wireless device and the congestion parameter, wherein the HPUE is assigned to the first port having higher congestion.

10. The system of claim 9, wherein the congestion parameter is a packet drop rate and the first port has a higher packet drop rate than the second port.

11. The system of claim 10, wherein the processor is further configured to assign the HPUE to the first port having the higher packet drop rate than the second port.

12. The system of claim 10, wherein the processor is further configured to assign the LPUE to the second port having a lower packet drop rate than the first port.

13. The system of claim 9, wherein the processor is coupled to a master node.

14. A processing node comprising:
- at least one processor programmed to perform operations including,
- identifying a packet drop rate for a first port and a second port of a cell site router (CSR);
- determining a characteristic of a wireless device communicating using the CSR, wherein determining the characteristic of the wireless device comprises identifying the wireless device as one of a low power user equipment (LPUE) and a high power user equipment (HPUE);
- comparing the identified packet drop rate for the first port and the second port; and
- assigning the wireless device to a port of the CSR based on the characteristic of the wireless device and the packet drop rate.

15. The processing node of claim 14, wherein the first port has a higher packet drop rate than the second port.

16. The processing node of claim 15, further comprising assigning the HPUE to the first port having the higher packet drop rate than the second port.

* * * * *